United States Patent
Wagers et al.

(10) Patent No.: US 9,580,256 B2
(45) Date of Patent: Feb. 28, 2017

(54) GRANULAR SPREADER SECTION CONTROL

(71) Applicant: Raven Industries, Inc., Sioux Falls, SD (US)

(72) Inventors: Jesse Lee Wagers, Sioux Falls, SD (US); Jared Ernest Kocer, Sioux Falls, SD (US); Nicholas O. Michael, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 128 days.

(21) Appl. No.: 14/207,889

(22) Filed: Mar. 13, 2014

(65) Prior Publication Data

US 2014/0263409 A1 Sep. 18, 2014

Related U.S. Application Data

(60) Provisional application No. 61/789,969, filed on Mar. 15, 2013.

(51) Int. Cl.
| | |
|---|---|
| *A01C 7/10* | (2006.01) |
| *B65G 53/40* | (2006.01) |
| *A01C 7/08* | (2006.01) |

(52) U.S. Cl.
CPC ............... *B65G 53/40* (2013.01); *A01C 7/081* (2013.01); *A01C 7/102* (2013.01)

(58) Field of Classification Search
CPC ............ A01C 7/081; A01C 7/08; A01C 7/00; A01C 7/102; A01C 7/10; B65G 53/40; B65G 53/34; B65G 53/00
See application file for complete search history.

(56) References Cited

U.S. PATENT DOCUMENTS

| | | | |
|---|---|---|---|
| 4,395,491 A | * | 7/1983 | Hohl ..................... C12P 17/181 435/262 |
| 5,337,959 A | | 8/1994 | Boyd |
| 5,635,911 A | | 6/1997 | Landers et al. |
| 5,704,546 A | | 1/1998 | Henderson et al. |
| 5,772,114 A | | 6/1998 | Hunter |
| 5,801,948 A | | 9/1998 | Wood |
| 5,864,781 A | | 1/1999 | White |
| 5,883,383 A | | 3/1999 | Dragne |
| 5,884,205 A | | 3/1999 | Elmore et al. |
| 5,884,224 A | | 3/1999 | McNabb et al. |
| 5,897,600 A | | 4/1999 | Elmore et al. |
| 5,911,362 A | | 6/1999 | Wood et al. |
| 5,913,915 A | | 6/1999 | McQuinn |

(Continued)

*Primary Examiner* — Christopher J Novosad

(74) *Attorney, Agent, or Firm* — Schwegman Lundberg & Woessner, P.A.

(57) ABSTRACT

This application discusses, among other things, granular spreaders. In an example, a granular spreader can include a blower configured to provide a flow of air, a metering device configured to provide a flow of granular material to the flow of air to provide a hybrid flow of air and granular material, a plurality of sections configured to release the granular material using the flow of air, wherein each section is configured to release an adjustable portion of the hybrid flow and a controller. The controller can be configured to receive control information for each section, to enable or disable each section responsive to the control information, and to adjust a speed of the blower based on the control information.

7 Claims, 4 Drawing Sheets

(56) References Cited

U.S. PATENT DOCUMENTS

| | | | |
|---|---|---|---|
| 5,919,242 A | 7/1999 | Greatline et al. |
| 5,936,234 A | 8/1999 | Thomas et al. |
| 5,938,071 A | 8/1999 | Sauder |
| 5,969,340 A | 10/1999 | Dragne et al. |
| 5,971,294 A | 10/1999 | Thompson et al. |
| 5,978,723 A | 11/1999 | Hale et al. |
| 6,070,538 A | 6/2000 | Flamme et al. |
| 6,070,539 A | 6/2000 | Flamme et al. |
| 6,079,340 A | 6/2000 | Flamme et al. |
| 6,093,926 A | 7/2000 | Mertins et al. |
| 6,122,581 A | 9/2000 | McQuinn |
| 6,189,807 B1 | 2/2001 | Miller et al. |
| 6,199,000 B1 | 3/2001 | Keller et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,373,057 B1 | 4/2002 | Penfold |
| 6,522,948 B1 | 2/2003 | Benneweis |
| 6,606,542 B2 | 8/2003 | Hauwiller et al. |
| 6,661,514 B1 | 12/2003 | Tevs et al. |
| 6,678,580 B2 | 1/2004 | Benneweis |
| 6,698,368 B2 | 3/2004 | Cresswell |
| 6,708,080 B2 | 3/2004 | Benneweis |
| 6,776,355 B2 | 8/2004 | Ringer et al. |
| 6,877,675 B2 | 4/2005 | Benneweis |
| 7,152,540 B1 | 12/2006 | Sauder et al. |
| 7,395,769 B2 | 7/2008 | Jensen |
| 7,472,660 B2 | 1/2009 | Mariman et al. |
| 7,478,603 B2 | 1/2009 | Riewerts et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,848,865 B2 | 12/2010 | Di Federico et al. |
| 8,078,367 B2 | 12/2011 | Sauder et al. |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,488,874 B2 | 7/2013 | Zaman et al. |
| 8,635,963 B2 | 1/2014 | Friggstad |
| 2002/0107609 A1 | 8/2002 | Benneweis |
| 2003/0070597 A1 | 4/2003 | Cresswell |
| 2007/0255502 A1* | 11/2007 | Pruett ................ A01B 79/005 702/19 |
| 2008/0127718 A1* | 6/2008 | Lesieur ................ G01N 11/08 73/54.09 |
| 2010/0095905 A1* | 4/2010 | Smelcer ................ F23D 14/02 122/14.2 |
| 2010/0101469 A1 | 4/2010 | Landphair et al. |
| 2010/0122644 A1* | 5/2010 | Memory ................ A01C 7/102 111/11 |
| 2010/0326339 A1* | 12/2010 | Georgison ............ A01C 7/081 111/175 |
| 2011/0054743 A1 | 3/2011 | Kocer et al. |
| 2011/0179984 A1 | 7/2011 | Beaujot et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2013/0061790 A1* | 3/2013 | Binsirawanich ....... A01C 7/081 111/174 |

* cited by examiner

GRANULAR SPREADER SECTION CONTROL

CLAIM OF PRIORITY

This application claims the benefit of priority under 35 U.S.C. §119(e) to Wagers et al., U.S. Provisional Patent Application Ser. No. 61/789,969, entitled "GRANULAR SPREADER SECTION CONTROL," filed on Mar. 15, 2013, which is hereby incorporated by reference herein in its entirety.

BACKGROUND

Air spreaders are commonly used in agricultural operations to apply particulate materials such as seed, fertilizer and/or herbicides into or onto the soil to enhance the potential bounty of the soil. These apparatus are often comprised of a wheeled cart that includes one or more tanks and meters to both hold and meter particulate materials. The metered particulate material can be delivered to the soil through pneumatic pipes that attach to ground-engaging openers which engage soil and permit delivery of particulate material such as seed or fertilizer to furrows which are created in the soil by the ground-engaging openers.

Historically, farm sizes have increased and likewise field sizes have increased. Seeding and fertilizing equipment has likewise become larger and more efficient. However, when attempting to seed/fertilize a smaller piece of land within a larger piece of land, or a piece of land with an irregular shape such as a triangle, the larger equipment can be difficult to use efficiently. For example, when seeding, these land irregularities can create a significant overlap in the area of soil being seeded and/or fertilized. As a result, the cost expended on seed and fertilizer is in excess of what is necessary for proper seeding and fertilizing. Existing equipment alleviated part of the problem of overlapping applications by allowing an operator to disable sections of air seeders and granular dispensing apparatus. However, enabling and disabling sections of apparatus can disrupt the air flow of the apparatus and result in non-uniform dispensing pattern of the particulate materials and damage to the particulate materials such as seeds.

SUMMARY

This application discusses, among other things, granular spreaders. In an example, a granular spreader can include a blower configured to provide a flow of air, a metering device configured to provide a flow of granular material to the flow of air to provide a hybrid flow of air and granular material, a plurality of sections configured to release the granular material using the flow of air, wherein each section is configured to release an adjustable portion of the hybrid flow and a controller. The controller can be configured to receive control information for each section, to enable or disable each section responsive to the control information, and to adjust a speed of the blower based on the control information.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
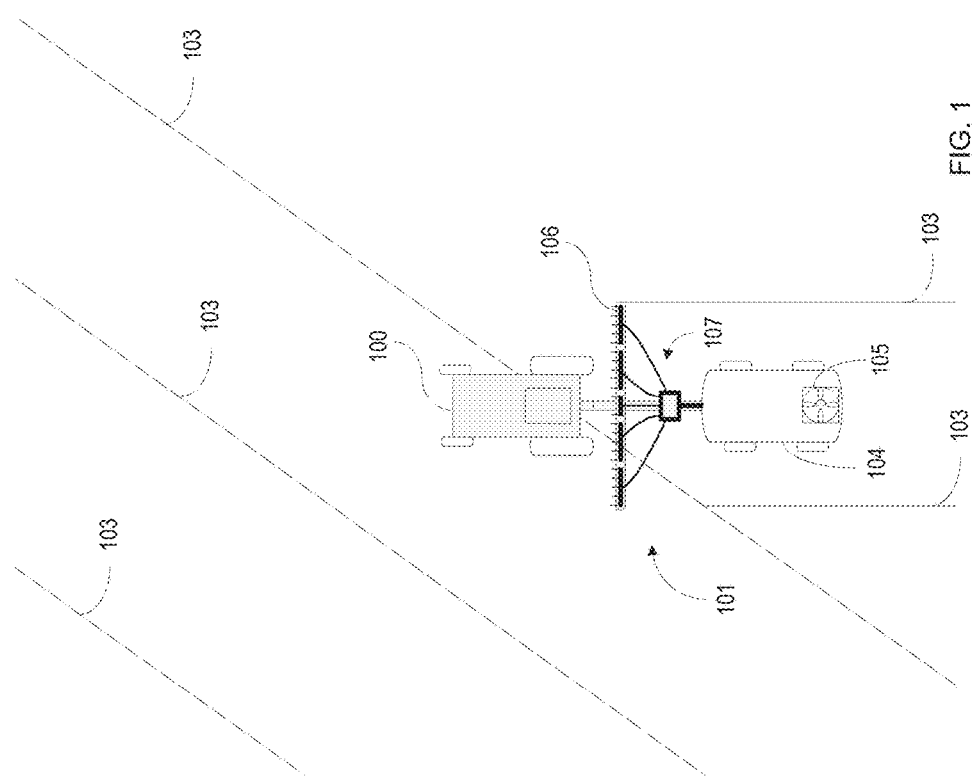
FIG. 1 illustrates an example multi-section, blower-based granular dispenser, or air spreader, being pulled over a field by a tractor.

The present inventors have recognized methods and apparatus for enhancing the performance of multi-section blower-based granular dispensing equipment even during periods of enabling and disabling sections of the equipment. FIG. 1 illustrates an example multi-section, blower-based granular dispenser, or air spreader 101, being pulled over a field by a tractor 100. In certain examples, the air spreader 101 can include a material bin 104, a blower 105, multiple spreader sections 106 and conduits 107 to provide the granular material of the material bin 104 to the multiple sections 106 using air from the blower 105. Superimposed on the field are lines 103 illustrating previous coverage paths of the spreader. In some examples, the air spreader 101 can be pulled behind a tractor 100. In some examples, the spreader can be self-propelled. For purposes of this document, air spreaders can include boom spreaders, rotary spreaders and spreaders that include openers for interacting with soil to embed spread material such as fertilizer, herbicide and/or seed. The multi-section configuration air spreader of FIG. 1 can include a spreader controller (not shown) to enable and disable individual sections of the air spreader. Such control can reduce overlapping coverage of spread material where spread paths intersect at angles other than 90 degrees. As discussed below, because spread coverage depends on the air flow provided by the blower 105, the inventors have recognized that control of blower speed as sections 106 are enabled and disabled can provide more predictable spread coverage as well as preventing damage to the spread material especially when the spread material includes seeds.

Figure 2:
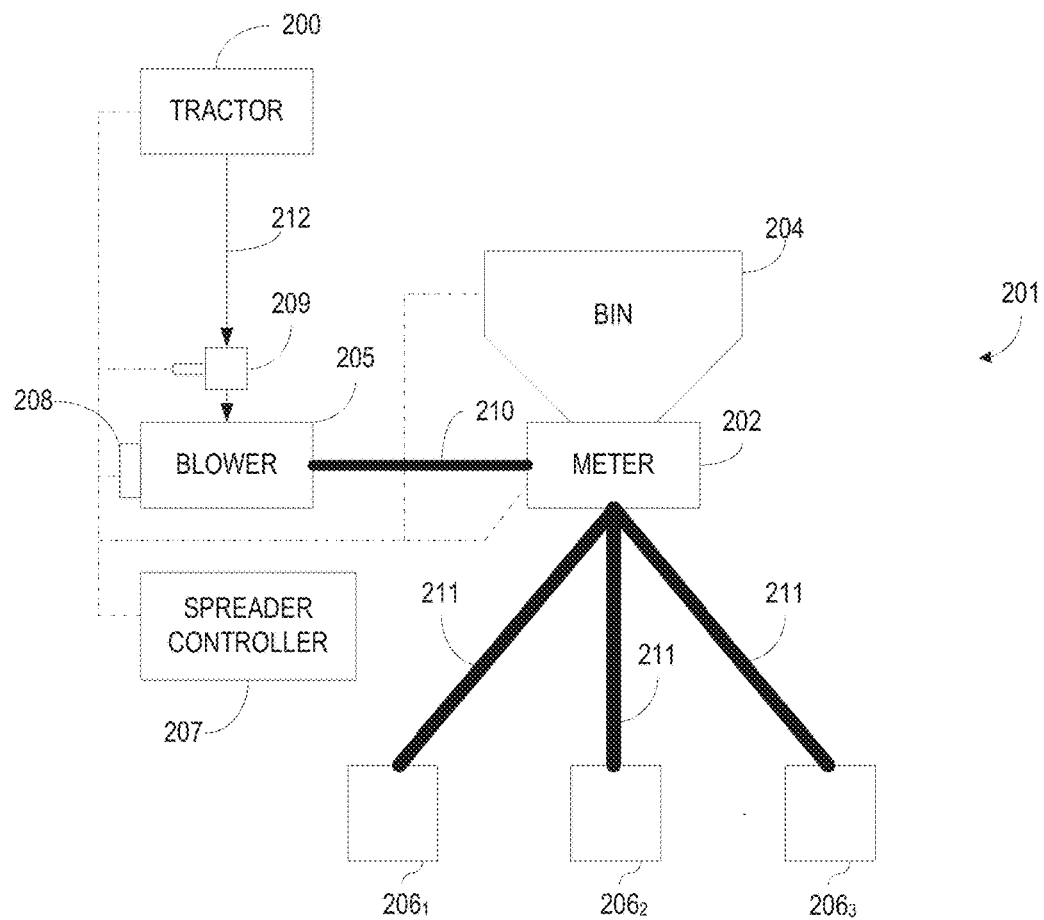
FIG. 2 illustrates generally an example granular dispensing apparatus.

FIG. 2 illustrates generally an example granular dispensing apparatus including a blower 205, a metering device 202, a plurality of sections 206 (e.g., $206_1$, $206_2$, . . . , $206_N$) and a spreader controller 207. In certain examples, the blower 205 can provide a flow of air 210 past the metering device 202 and into each of the sections 206. In certain examples, the metering device 202 can provide a flow of particulate, or spreader material, into the flow of air from the bin 204. The spreader material can form a hybrid flow 211 of air and spreader material and can ride the flow of air to the sections 206. At the sections 206, the hybrid flows 211 can be released to deposit the spreader material on the ground with or without a spinner, or can place the spreader material in the ground using opener assemblies associated with the sections 206. In certain examples, the spreader controller 207 can receive operator inputs for a particular seed application, fertilizer application, or herbicide application, and can set the speed of the blower 205 and the metering device 202 in response to the operator inputs. In certain examples, the spreader controller 207 can allow the operator to enable and disable individual sections 206 to allow more efficient application of the spreader materials such as to prevent substantial overlap of dispensed granular materials.

In some examples, the spreader controller 207 can control the speed of the metering device 202 in response to a section 206 being enabled or disabled. In certain examples, the metering device can include, but is not limited to, a metering belt, a metering wheel, a metering auger or combinations thereof.

In certain examples, the spreader controller 207 can adjust the speed of the blower 205 to alleviate significant and persistent air flow disruptions that can occur when one or more sections 206 are enabled or disabled. In certain examples, the blower 205 can include a fan, such as a fan driven by a hydraulic motor and the spreader controller 207 can adjust the fan speed using a proportional valve 209 in a hydraulic circuit 212 providing power to the fan motor. In certain examples, a tractor 200 can provide power to drive the blower 205. In certain examples, the tractor 200 can provide mechanical power to driver the blower 205. In some applications, the tractor 200 can provide hydraulic power to drive the blower 205. In some examples, the blower 205 can include multiple fans.

In certain examples, the blower 205 can include a speed sensor 208 to provide speed information about the blower 205, such as rotation speed of one or more fans of the blower, air speed, or combinations thereof. In certain example, the speed information from the speed sensor 208 can provide feedback to the spreader controller to more precisely regulate the speed of the blower 205.

In certain examples, each section 206 can include a valve to enable and disable the section 206. In some examples, the valve can include an actuator for positioning the valve although a manually actuated valve can also be used. In some examples, the valve or a point downstream of the valve can include a feedback sensor coupled to the spreader controller 207, for example. In certain example the feedback sensor can provide a measurement signal or an estimation signal of the flow of spreader material for the section 206. In certain examples, the feedback sensor can include, but is not limited to, a position sensor on the valve, an acoustic sensor, a force plate, an optical sensor for generally detecting the spreader material in the flow, a microwave sensor for detecting individual spreader material elements in the flow, or combinations thereof. In certain examples, the feedback can be used to modulate the speed of the fan or the position of the section valve to more accurately achieve target coverage of the spreader material on the field.

Figure 3:
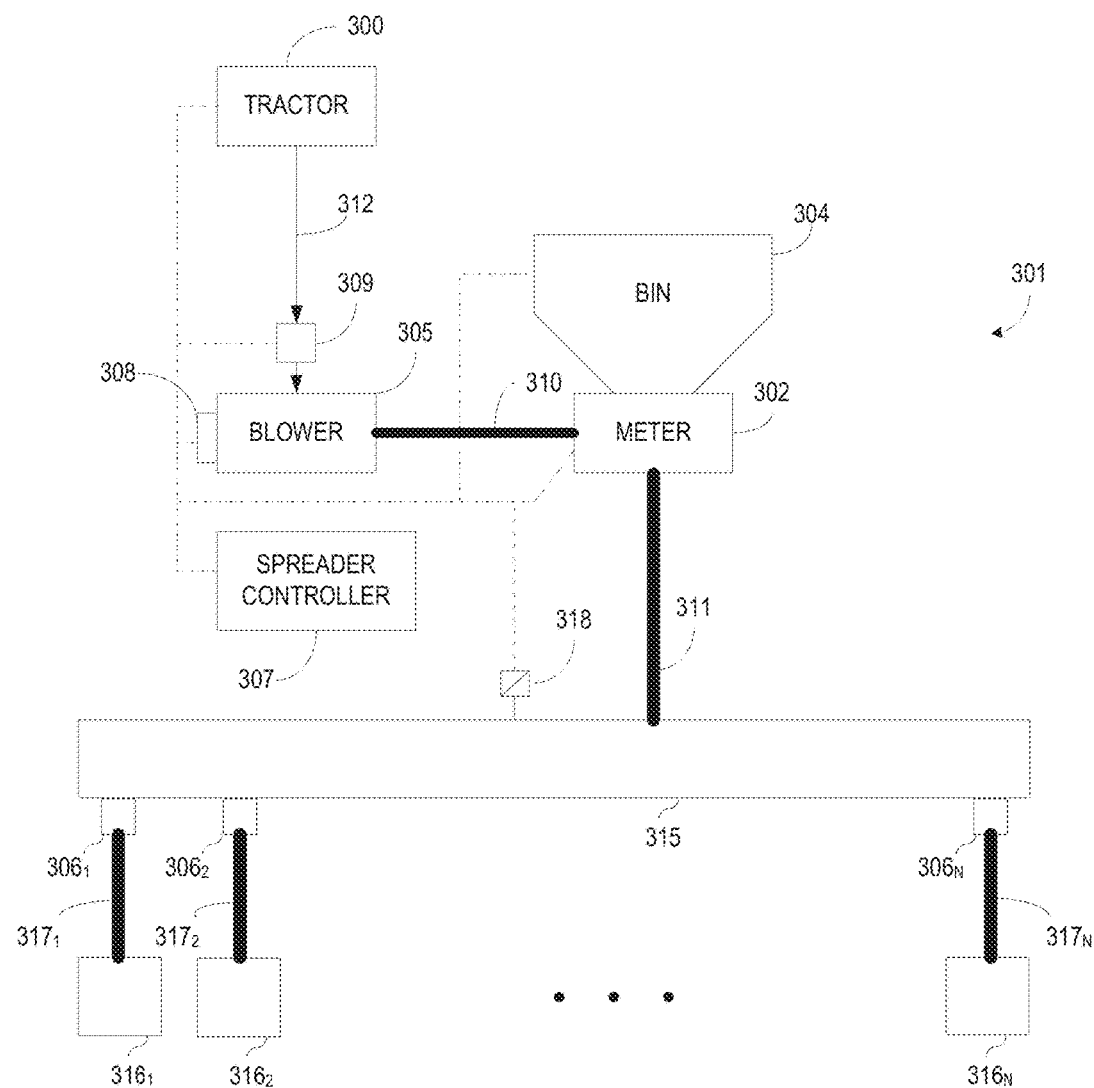
FIG. 3 illustrates generally an example air spreader.

FIG. 3 illustrates generally an example air spreader 301, such as a seeder, including a blower 305, a metering device 302, a manifold 315, a plurality of sections 306 (e.g., $306_1$, $306_2$, ..., $306_N$) and a spreader controller 307. In certain examples, the blower 305 can provide a flow of air 310 past the metering device 302 and into each of the manifold 315. In certain examples, the metering device 302 can provide a flow of particulate, or spreader material, into the flow of air from the bin 304. The spreader material can form a hybrid flow 311 of air and spreader material and can ride the flow of air through the manifold 315 to the sections 306. At the sections 306, secondary hybrid flows 317 (e.g., $317_1$, $317_2$, ..., $317_N$) can be released to deposit the spreader material on the ground with or without a spinner, or can place the spreader material in the ground using opener assemblies 316 (e.g., $316_1$, $316_2$, ..., $316_N$) associated with the sections 306. In certain examples, the spreader controller 307 can receive operator inputs for a particular seed application, fertilizer application, or herbicide application, and can set the speed of the blower 305 and the metering device 302 in response to the operator inputs. In certain examples, the spreader controller 307 can allow the operator to enable and disable individual sections 306 to allow more efficient application of the spreader materials such as to prevent substantial overlap of dispensed granular materials. In certain examples, valve assemblies can be used to modify the secondary hybrid flows to allow a section to be enabled and disabled. In some examples, the valve assemblies can be integrated with the manifold 315 or the section 306. In certain examples, one or more sections 306 can include a secondary header providing additional hybrid flows to one or more subsections or one or more openers 316.

In certain examples, each section 306 can include a valve to enable and disable the section 306. In some examples, the valve can include an actuator for positioning the valve although a manually actuated valve can also be used. In some examples, the valve or a point downstream of the valve can include a feedback sensor coupled to the spreader controller 307, for example. In certain example the feedback sensor can provide a measurement signal or an estimation signal of the flow of spreader material for the section 306. In certain examples, the feedback sensor can include, but is not limited to, a position sensor on the valve, an acoustic sensor, a force plate, an optical sensor for generally detecting the spreader material in the flow, a microwave sensor for detecting individual spreader material elements in the flow, or combinations thereof. In certain examples, the feedback can be used to modulate the speed of the fan or the position of the section valve to more accurately achieve target coverage of the spreader material on the field.

In some examples, the spreader controller 307 can control the speed of the metering device 302 in response to a section 306 being enabled or disabled. In certain examples, the metering device 302 can include, but is not limited to, a metering belt, a metering wheel, a metering auger or combinations thereof.

In certain examples, the spreader controller 307 can adjust the speed of the blower 305 to alleviate significant and/or persistent air flow disruptions that can occur when one or more sections 306 are enabled or disabled. In certain examples, the blower 305 can include a fan, such as a fan driven by a hydraulic motor and the spreader controller 307 can adjust the fan speed using a proportional valve 309 in a hydraulic circuit 312 providing power to the fan motor. In certain examples, a tractor 200 can provide power to drive the blower 305. In certain examples, the tractor 300 can provide mechanical power to driver the blower 305. In some applications, the tractor 300 can provide hydraulic power to drive the blower 305. In some examples, the blower 305 can include multiple fans.

In certain examples, the blower 305 can include a speed sensor 308 to provide speed information about the blower 305, such as rotation speed of one or more fans of the blower, air speed, or combinations thereof. In certain example, the speed information from the speed sensor 308 can provide feedback to the spreader controller to more precisely regulate the speed of the blower 305.

In certain examples, the air spreader 301 can include a manifold pressure sensor 318 for providing pressure information of the manifold 315. In some examples, the spreader controller can adjust the speed of the blower 305 using the manifold pressure information to provide a more consistent flow of spreader product even as sections 306 are enabled and disabled.

Figure 4:
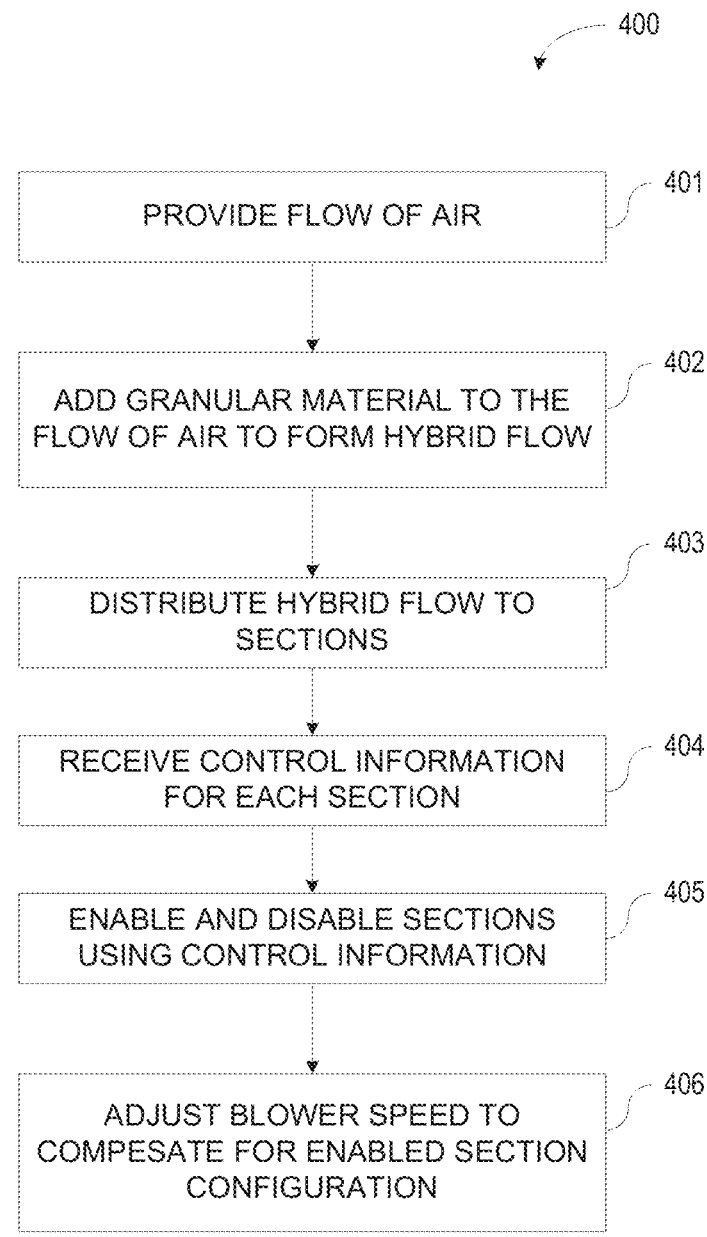
FIG. 4 illustrates generally a flowchart of an example method of operating a multi-section, blower-based, granular dispenser, or spreader.

FIG. 4 illustrates generally a flowchart of an example method 400 of operating a multi-section, blower-based, granular dispenser, or spreader. In certain examples, at 401, the method 400 can include providing a flow of air using a blower. At 402, the method can include adding a flow of granular material to the flow of air to form a hybrid flow of air and granular material. In certain example, a metering device can add granular material from a bin of the spreader to the flow of air. In some examples, the metering device can be adjustable to provide different coverage rates. At 403, the method can include distributing the hybrid flow to a plurality of sections. In some examples, the hybrid flow can be distributed using a manifold. At 404 and 405, the method can include receiving control information to enable or disable one or more of the sections, and enabling and disabling sections using the control information. Enabling and disabling sections of the spreader can allow the spreader to minimize overlapping coverage of the spreader material. In certain examples, the control information can be generated by a spreader controller and can be based on global positioning system (GPS) information received by the spreader controller.

At 406, the method can include adjusting a speed of the blower to compensate for the changes in the enabled configuration of the sections. In certain examples, a spreader controller can include one or more blower profiles stored in memory associated with the spreader controller. In some examples, a blower profile can provide target blower speed information as a function of enabled and disabled sections. In some examples, a blower profile can be specific to a particular granular material. In certain examples, a blower profile can provide target pressure information as a function enabled and disabled sections. In some examples, the spreader controller can adjust the blower speed using the target pressure information and actual pressure information received from a pressure transducer located in the air flow or hybrid air flow.

ADDITIONAL NOTES

In Example 1, an apparatus can include a blower configured to provide a flow of air, a metering device configured to provide a flow of granular material to the flow of air to provide a hybrid flow of air and granular material, a plurality of sections configured to release the granular material using the flow of air, wherein each section is configured to release an adjustable portion of the hybrid flow, and a controller configured to receive control information for each section, to enable or disable each section responsive to the control information, and to adjust a speed of the blower based on the control information.

In Example 2, the blower of example 1 optionally includes one or more fans.

In Example 3, the metering device of any one or more of Examples 1-2 optionally includes a metering belt;

In Example 4, the metering device of any one or more of Examples 1-3 optionally includes a metering wheel.

In Example 5, the metering device of any one or more of Examples 1-4 optionally includes an auger.

In Example 6, the apparatus of any one or more of Examples 1-5 optionally includes a first manifold configured to receive the hybrid flow and provide a plurality of partial hybrid flows to the plurality of sections.

In Example 7, the apparatus of any one or more of Examples 1-6 optionally includes a manifold pressure sensor configured to provide pressure information of the manifold.

In Example 8, the controller of any one or more of Examples 1-7 optionally is configured to compare the pressure information to target pressure information and to adjust the speed of the blower using the comparison.

In Example 9, the controller of any one or more of Examples 1-8 optionally includes memory configured to store one or more blower profiles, each profile optionally based on a different granular material, wherein each blower profile is configured to provide a target blower speed as a function of the control signals, and wherein the controller optionally is configured to adjust the speed of the blower using the target blower speed.

In Example 10, the blower of any one or more of Examples 1-9 optionally includes a speed sensor configured to provide speed information of the blower, and wherein the controller is configured to regulate the speed of the blower using the speed information.

In Example 11, a method can include providing a flow of air using a blower, adding a flow of granular material to the flow of air using a metering device to provide a hybrid flow of air and granular material, distributing the hybrid flow to at least one section of a plurality of sections, releasing the granular material using the flow of air at the one section, receiving control information for each section of the plurality of sections at a controller, enabling and disabling each section of the plurality of sections responsive to the control information using the controller, and adjusting a speed of the blower based on the control information using the controller.

In Example 12, the adjusting a speed of any one or more of Examples 1-11 optionally includes adjusting a speed of at least one fan of a plurality of fans of the blower.

In Example 13, the adding a flow of granular material of any one or more of Examples 1-12 optionally includes adding a flow of granular material using a metering belt.

In Example 14, the adding a flow of granular material of any one or more of Examples 1-13 optionally includes adding a flow of granular material using a metering wheel.

In Example 15, the adding a flow of granular material of any one or more of Examples 1-14 optionally includes adding a flow of granular material using an auger.

In Example 16, the distributing the hybrid flow of any one or more of Examples 1-2 optionally includes receiving the hybrid flow at a manifold, and distributing the hybrid flow to at least one section of a plurality of sections using the manifold.

In Example 17, the method of any one or more of Examples 1-16 optionally includes receiving pressure information of the manifold at the controller.

In Example 18, the method of any one or more of Examples 1-17 optionally includes comparing the pressure information of the manifold to target pressure information using the controller to provide a pressure error; and
  wherein the adjusting a speed of the blower includes adjusting the speed of the blower using the pressure error.

In Example 19, the method of any one or more of Examples 1-18 optionally includes storing one or more blower profiles in memory associated with the controller, each profile is based on a different granular material, determining a target blower speed using the control signals and a blower profile of the one or more blower profiles, and wherein the adjusting the speed of the blower optionally includes adjusting the speed of the blower using the target blower speed.

Example 20 can include, or can optionally be combined with any portion or combination of any portions of any one or more of Examples 1 through 19 to include, subject matter that can include means for performing any one or more of the functions of Examples 1 through 19, or a machine-readable medium including instructions that, when performed by a machine, cause the machine to perform any one or more of the functions of Examples 1 through 19.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
    a blower configured to provide a flow of air;
    a metering device configured to provide a flow of granular material to the flow of air to provide a hybrid flow of air and granular material;
    a plurality of sections configured to release the granular material using the flow of air, wherein each section is configured to release an adjustable portion of the hybrid flow;
    a first manifold configured to receive the hybrid flow and provide a plurality of partial hybrid flows to the plurality of sections;
    a manifold pressure sensor configured to provide pressure information of the first manifold; and
    a controller to receive control information for each section, to enable or disable each section responsive to the control information, and to adjust a speed of the blower using the pressure information and target pressure information.

2. The apparatus of claim 1, wherein the blower includes one or more fans.

3. The apparatus of claim 1, where in the metering device includes a metering belt.

4. The apparatus of claim 1, wherein the metering device includes a metering wheel.

5. The apparatus of claim 1, wherein the metering device includes an auger.

6. The apparatus of claim 1, wherein the controller includes memory configured to store one or more blower profiles, each profile based on a different granular material;
    wherein each blower profile is configured to provide a target blower speed as a function of the control signals; and
    wherein the controller is configured to adjust the speed of the blower using the target blower speed.

7. The apparatus of claim 1, wherein the blower includes a speed sensor configured to provide speed information of the blower, and wherein the controller is configured to regulate the speed of the blower using the speed information.

* * * * *

UNITED STATES PATENT AND TRADEMARK OFFICE
CERTIFICATE OF CORRECTION

PATENT NO. : 9,580,256 B2  
APPLICATION NO. : 14/207889  
DATED : February 28, 2017  
INVENTOR(S) : Wagers et al.

Page 1 of 1

It is certified that error appears in the above-identified patent and that said Letters Patent is hereby corrected as shown below:

In the Specification

In Column 3, Line 21, delete "driver" and insert --drive-- therefor

In Column 4, Line 50, delete "driver" and insert --drive-- therefor

Signed and Sealed this  
Twenty-fourth Day of July, 2018

Andrei Iancu  
*Director of the United States Patent and Trademark Office*